Aug. 9, 1960  R. V. BURT  2,948,376
APPARATUS FOR STOPPING CONTAINERS ON A CONVEYOR
Filed Feb. 21, 1958
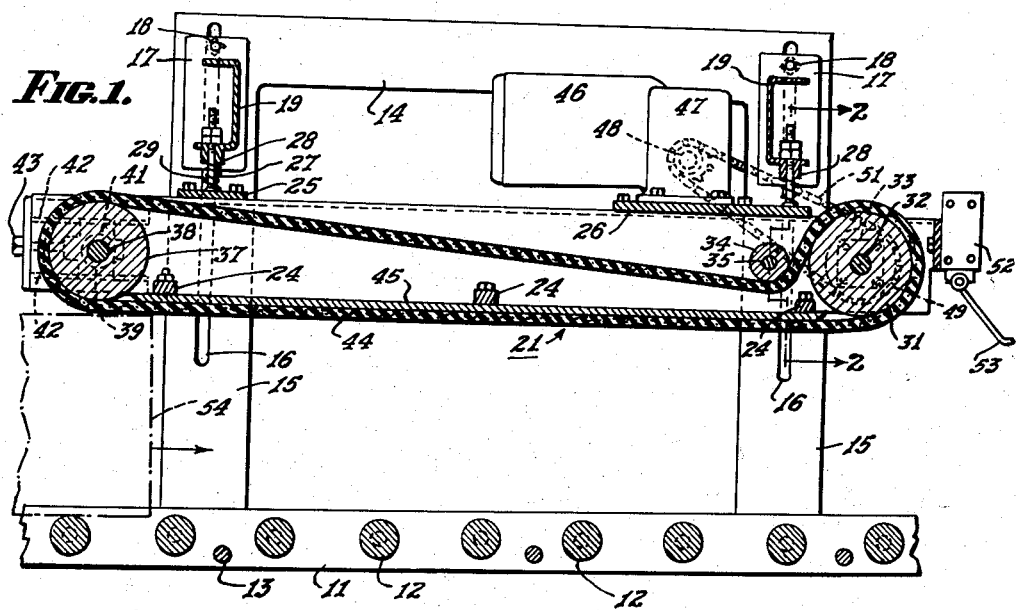
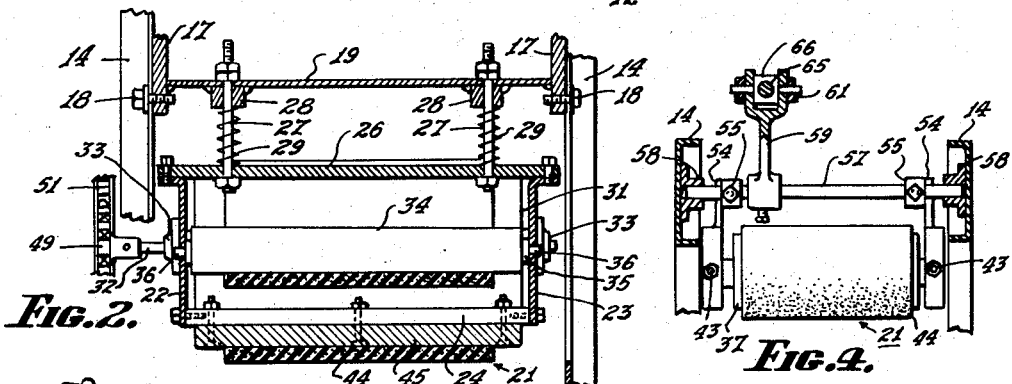
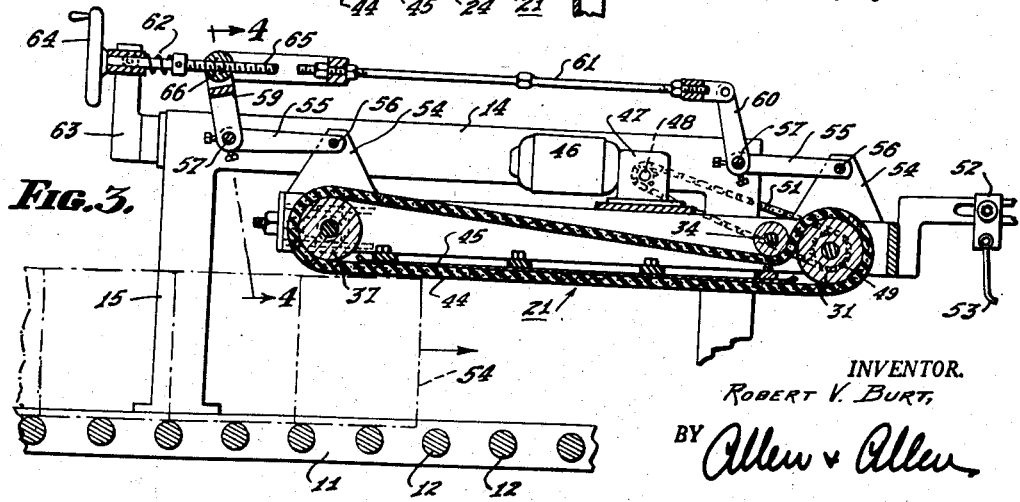
INVENTOR.
ROBERT V. BURT,
BY Allen & Allen
ATTORNEYS.

United States Patent Office 2,948,376
Patented Aug. 9, 1960

2,948,376

APPARATUS FOR STOPPING CONTAINERS ON A CONVEYOR

Robert V. Burt, Cincinnati, Ohio, assignor to The Procter & Gamble Company, Cincinnati, Ohio, a corporation of Ohio Filed Feb. 21, 1958, Ser. No. 716,673

12 Claims. (Cl. 193—40)

This invention relates to container handling apparatus and more particularly, to an apparatus and method for stopping a plurality of containers on a conveyor.

One of the difficult problems encountered in handling a variety of container sizes with present day equipment is in stopping a plurality of containers on a collecting conveyor prior to feeding a given number of the containers to another station for further handling. For example, if a product is packed in three different size containers and fed to a loading station on separate conveyors for each size, it may be desirable to feed a predetermined number of containers of one size while holding back or stopping the containers in the two other sizes. When the required number of containers of the one size have been fed, then it is necessary to stop further feeding of containers of this size so that a different size can be fed to the handling station or apparatus. One of the difficulties in such an operation is the provision of satisfactory equipment for stopping a plurality of containers of any one size when in motion on the feeding conveyor. One of the present practices is to use either a fully or partially powered roller conveyor or a long belt conveyor. Such conveyors may be started and stopped at will in order to stop the moving containers and prevent further feeding. However, they are undesirable due to high initial cost and since their capacity is limited to their overall length. Maintenance and operating costs have also been found to be high. Another method and apparatus used for stopping containers on a conveyor is a retractable stop including means for raising the stop into the path of the moving containers. This type of stop usually consists of a retractable member mounted between two adjoining rollers of a single roller conveyor. The principal drawback of such a stop is that it only bears on a relatively small area of the forward container surface making the forward surface susceptible to impact damage as successive containers strike the first stopped or any succeeding stopped container. This frequently results in irreparable damage to the forward surface of the first container making it necessary to remove and replace that container each time a series of containers is stopped.

It is a broad object of the present invention to provide a method and apparatus for stopping containers which obviates the above difficulties.

Another object of the present invention is the provision of an apparatus and method for stopping containers on a roller conveyor which does not damage the containers and yet is effective in stopping them.

Still another object of the present invention is the provision of an apparatus and method for stopping containers which permits a large number of containers to be stacked up or held back on a sloping roller conveyor.

A further object of this invention is the provision of an apparatus and method for stopping containers which is relatively inexpensive and can be installed over a relatively short length of conveyor.

Still a further object of this invention is the provision of an apparatus and method for stopping containers in which the containers are held against movement by a wedging action between a pair of conveyors.

Briefly stated, in one embodiment the present invention contemplates the provision of an endless belt adjustably mounted above a roller conveyor. The belt is adjusted so that containers moving down the roller conveyor can be wedged between the rollers and the belt when the latter is stopped. Thus, each successive container is stopped by the first container wedged between the belt and the rollers. The belt is preferably provided with a relatively high friction surface. This minimizes container slippage caused by the impact of succeeding containers as they back up on the roller conveyor.

While the specification concludes with claims particularly pointing out and distinctly claiming the subject matter regarded as forming the present invention, it is believed the invention will be better understood from the following description taken in connection with the accompanying drawing in which:

Figure 1 is an elevation of the container stop partly in cross-section showing the belt overhanging the roller conveyor; and Figure 2 is a cross-section taken along the lines 2—2 of Figure 1 showing the snubber roll and the manner of adjustably mounting the belt frame; and Figure 3 is an elevation partly in cross-section of the container stop showing a modified mechanism for adjustably mounting the belt frame; and Figure 4 is a cross-section taken along the lines 4—4 of Figure 3 showing a portion of the adjusting mechanism.

Referring now to Figures 1 and 2, a conventional gravity roller conveyor comprising side frames 11 (only one shown) is designed to support a plurality of closely spaced rollers 12 which are mounted for free rotation by means of conventional ball or roller bearings. A plurality of support bars 13 are provided at spaced intervals along the conveyor frames 11 and in order to give the conveyor rigidity.

A pair of inverted, substantially U-shaped frame members 14 are mounted over each of the conveyor frames 11. Each frame member 14 is provided with vertical legs 15 which can be attached to the top or sides of the conveyor frames 11. The vertical legs 15 are provided with slots 16. An adjustable slide member 17 held by the screws 18 is vertically adjustable in each of the slots 16. A pair of belt frame supports 19 have their ends attached to the members 17 and extend across and overhang the roller conveyor.

A belt frame 21 is suspended from the supports 19. The belt frame consists of a pair of side wall members 22 and 23, bottom members 24 and the top supports 25 and 26. The entire belt frame assembly 21 is suspended from the supports 19 by means of the bolts 27 which pass through the bosses 28 attached to the supports 19. The compression springs 29 are provided between the supports 25, 26 and the supports 19 in order to allow limited upward movement of the belt frame on impact of the containers.

A drive pulley 31 is supported on the shaft 32 which is mounted in bearings 33 in the side wall members 22 and 23. Similarly, a snubber roll 34 is mounted on a shaft 35 which is supported for rotation in the bearings 36. An idler pulley 37 mounted on the shaft 38 is supported by a pair of bearings 39 (only one bearing 39 shown) in a movable pillow block 41 which is slidable in the guides 42 for adjustment by the screw 43. A movable pillow block 41 including guides 42 and a screw 43 are provided for each bearing 39.

An endless belt 44 having a high friction outer surface, for example a crepe rubber surface, is mounted over the pulleys 31 and 37 and under the snubber roll 34. A high friction surface is desirable in order to reduce slippage of the containers with respect to the belt, although it will be understood as the description proceeds that slippage is not necessarily eliminated and that a relatively small amount of slippage may be desirable. The snubber roll 34 allows the belt to be wrapped around the drive pulley 31 to give an angle of contact greater than 180°. A large angle of contact, preferably in excess of 180°, is desirable in order to minimize belt slippage on the drive pulley. It is to be noted that belt slippage on the drive pulley is not necessarily eliminated with this construction, it is greatly reduced however. It may, of sourse, be possible under some conditions, to eliminate the snubber roll 34 where the containers are light or where only a relatively few containers are being stopped. Thus, the use of the snubber roll 34 is not essential to the satisfactory operation of the invention although its use will be found desirable in most instances. The surface of the drive pulley 31 may be covered with a high friction material in order to reduce but not necessarily eliminate belt slippage. A rubber surface pulley has been found satisfactory for this purpose. Again, the use of such a surface on the drive pulley is not necessary to the success of the invention, but it is usually helpful under most operating conditions. Tension in the belt 44 can be adjusted by means of the adjusting screws 43.

A backing panel 45 is attached to the bottom members 24 by suitable means. The backing panel 45 is preferably made from a highly polished material having a low coefficient of friction, such as a highly polished piece of wood, in order to reduce the friction between the inside surface of the belt 44 and the face of the panel 45 when the belt 44 is in motion over the panel 45.

A suitable motive power source 46, for example, an electric motor, is used to drive the belt through a worm gear 47 or other non-reversible drive by means of the sprockets 48, 49 and the chain 51. The motor 46 and the worm gear 47 are mounted on the support 26. The use of a non-reversible drive is preferred since it will act as a brake to prevent turning of the drive pulley 31 when a relatively high frictional force is applied to the belt, for example, when a large number of containers are being held back.

A counting device 52 is mounted beyond the drive pulley 31 and has a pivoted sensing arm 53 attached thereto. The sensing arm is arranged to operate the counting device to sense successive containers as they pass from the stop. The counting device and its sensing arm are conventional items that will be familiar to those skilled in the art thus precluding the necessity of a detailed disclosure of their structure.

In operation, the height of the belt 44 is adjusted by moving the slide members 17 in the slots 16 so that the distance from the rollers to the lower face of the belt is slightly greater than the height of the containers at the inlet end of the stop near the idler pulley 37; and so that the distance from the rollers to the lower face of the belt is slightly less than the height of the containers at the outlet end of the stop near the drive pulley 31. Thus the belt 44 is slightly inclined with respect to the rollers in order to wedge and thereby stop containers moving into the stop. The inclination of the belt with respect to the rollers is highly desirable to the successful practice of the invention although a belt that is parallel to the rollers will operate with some success but with considerable less efficiency particularly when the container height dimension varies as it will in actual practice. Thus, when the first container 54 comes down the gravity roller conveyor, it will be wedged between the rollers 12 and the belt 44 as illustrated in Figure 1 provided the belt is stationary at the time. This clamping or wedging action causes the container to stop by virtue of the frictional resistance to movement supplied by the belt. While the forward portion of the stopped container may be slightly deformed as it is stopped, this deformation is maintained at a minimum and is not sufficient to impart permanent or undesirable damage because the distance from the belt surface to the rollers at the outlet end of the stop is only slightly less than the height dimension of the container and the springs 29 give the belt frame 21 a limited amount of resiliency. The amount of slippage that occurs between the container and the belt and/or the belt and the pulleys is relatively slight and will vary, of course, depending on the weight of the container, its velocity and the position of the belt over the rollers compared with the height of the containers.

The second container coming down the gravity roller conveyor will strike the stopped container. This causes some slight slippage between the first stopped container and belt and/or between the belt and its pulleys. As the third, fourth, fifth, etc. containers strike the stopped containers, there is again very limited slippage of the first container but this slippage decreases as the gripping force due to the increased wedging action increases.

In one installation, with a straight run of gravity roller conveyor about 88 feet long at a pitch of 5/8" per foot, and with filled containers weighing about 40 pounds each, it was observed that the total slippage of the first stopped container was about 4"–5" from the point at which it was stopped until a total of 50 containers had been stopped.

After a sufficient number of containers are collected, the motor 46 can be started. This puts the belt 44 in motion, thus feeding containers past the sensing arm 53. The sensing arm 53 coacts with the counting device 52 to control the number of containers fed. The counting device 52 is preferably designed to automatically shut off the motor 46 after a predetermined number of containers have been fed from the stop. Alternatively, the motor controls can be selectively actuated to feed any desired number of containers.

When the belt 44 is again stopped, a container may be partially beneath the belt 44 with its rear portion projecting beyond the inlet end of the stop. Under these circumstances the container itself will act as a stop for successive containers and the first container will be wedged between the belt and the rollers by the impact from the following containers. Under some conditions of operation and especially where containers are being fed in close succession, there may be a plurality of contiguous containers clamped beneath the belt 44 when it is stopped. These clamped containers then serve as a stop for any additional containers coming down the gravity roller conveyor. In other cases, there may be no container projecting from the inlet to the stop. In such an event the device will act in the manner previously described.

Under any previously described condition, the total slippage of a container or containers with respect to the belt and/or the belt with respect to the pulleys is relatively slight. This slippage is insufficient to discharge the container nearest the outlet end of the stop since the device is normally adjusted to leave a sufficient length of this container wedged beneath the belt to prevent its dislodgement due to the slight slippage that may occur.

A modified embodiment of the apparatus is illustrated in Figures 3 and 4 wherein like parts have the same notation previously employed. A mechanism for rapid adjustment of the belt height is shown wherein the belt frame 21 is provided with a pair of support flanges 54 at each end. Crank members 55 are journaled on the shafts 56 attached to the flanges 54. The other ends of the members 55 are attached to the shafts 57 which are rotatable in the bearings 58 supported in the frames 14. Fork members 59 and 60 are attached to the shafts 57. An adjustable connecting link 61 is mounted between the fork members 59 and 60. An adjusting screw 62 is supported by a bracket 63. The adjusting screw has a handwheel 64 attached to one end. The other end of the adjusting screw is threaded as at 65 and passes through an adjusting nut 66 pivotally mounted in the fork 59.

Thus, with the mechanism shown in Figures 3 and 4, the belt 44 can be raised and lowered by merely turning the handwheel 64. It will be evident that turning the handwheel in one direction will cause the fork members 59 and 60 to move clockwise thereby lowering the belt 44; moving the handwheel in the other direction causes the fork members 59 and 60 to move counterclockwise thereby raising the belt 44. Further, the outlet end of the stop, i.e. the portion of the belt 44 near the drive pulley 31, can be raised or lowered independently to obtain the desired wedging action by merely changing the length of the adjustable connecting link 61.

In addition to the embodiments already illustrated and described, the invention can be practiced in combination with a powered roller conveyor in place of the gravity roller conveyor described heretofore. It is also possible to practice the invention by placing the driven belt on the same plane as the roller conveyor and placing a series of opposing rollers mounted above the driven belt in order to obtain the wedging action for stopping containers. Upper and lower belts either one of which is power driven, may also be used. In still another modification, a series of upper and lower rubber covered pulleys can be substituted to achieve the objects of the invention with either the upper or lower pulleys being power driven.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for stopping containers on a roller conveyor comprising a frame rigidly mounted astraddle said conveyor, a belt frame suspended from said frame and overhanging said conveyor, a pair of pulleys mounted on said belt frame, an endless belt having a high friction facing mounted for movement by said pulleys, said belt being driven by one of said pair of pulleys, said one of said pair being the drive pulley, the lower flight of said belt being slightly inclined to and spaced from said roller conveyor so that the distance from the rollers to the belt is slightly greater than the height of containers being handled at one end and slightly less at the other end, a smooth unyielding supporting surface contiguous to said lower flight of said belt to prevent substantial deflection thereof, means for driving said belt, and means for stopping said driving means whereby further movement of containers wedged between said belt and said roller conveyor is stopped, said containers acting as a stop for successive containers coming down said roller conveyor.

2. Apparatus as claimed in claim 1 including means for adjusting the distance from the rollers to the belt.

3. Apparatus as claimed in claim 1 wherein the drive pulley has a high friction surface.

4. Apparatus as claimed in claim 3 including a snubber roll mounted to give the belt an angle of contact in excess of 180° around the drive pulley.

5. A container stop comprising a high friction belt overhanging a conveyor, said belt being slightly inclined with respect to said conveyor and spaced therefrom so that the distance from the belt to the conveyor is slightly greater than the height of containers being handled at one end and slightly less at the other end, a smooth unyielding supporting surface contiguous to the lower flight of the belt to prevent substantial deflection thereof, means for selectively driving and stopping said belt, said belt being adapted to wedge containers against said conveyor thereby causing containers moving on said conveyor and beneath said belt to stop when said belt is not in motion whereby all successive containers are stopped behind said containers clamped between said belt and said conveyor.

6. A container stop as claimed in claim 5 including means for driving said belt to feed a predetermined number of containers from said stop and means for thereafter automatically stopping said belt.

7. A container stop as claimed in claim 5 including a high friction drive pulley for said belt.

8. A container stop as claimed in claim 7 including a snubber roll adapted to make the angle of contact between said belt and said drive pulley exceed 180°.

9. Apparatus for stopping containers on a feeding conveyor and thereafter discharging a predetermined number of containers comprising a pair of opposed conveyors mounted near the end of a feeding conveyor, backing means on each of said conveyors to prevent substantial deflection thereof when stopping containers, one of said opposed conveyors having a power drive, said opposed conveyors being spaced apart so that containers therebetween are subjected to a wedging action, the wedging action on containers between the opposed conveyors being sufficient to stop and back up a plurality of containers on the feeding conveyor when the power driven conveyor is idle and means for starting said power driven conveyor to feed a predetermined number of containers.

10. A container stop apparatus having in combination a belt frame overhanging a roller conveyor, said belt frame having side walls and a bottom wall, a backing panel mounted on said bottom wall, said backing panel having a polished, low friction face, a drive pulley and an idler pulley mounted at either end of said belt frame and supported by said side walls, an endless belt having a high friction outer surface mounted over said pulleys and having its inner surface bearing against said backing panel when its lower flight travels between said pulleys, means for adjusting the position of said belt above said roller conveyor, means for driving and stopping said belt, said belt being adjusted so that the distance from the belt to the roller conveyor at the inlet end is slightly greater than the height of containers being handled and the distance from the belt to the roller conveyor at the outlet end is slightly less than the height of containers being handled, whereby containers on said conveyor can be stopped by wedging action between said belt and said roller conveyor when the belt is not in motion.

11. A container stop apparatus as claimed in claim 10 wherein said drive pulley has a high friction surface.

12. A container stop apparatus as claimed in claim 11 including a snubber roll adapted to make the angle of contact between said belt and said drive pulley more than 180°.

References Cited in the file of this patent

UNITED STATES PATENTS

| | | |
|---|---|---|
| 1,482,197 | Kimball | Jan. 29, 1924 |
| 1,692,860 | Petri | Nov. 27, 1928 |
| 1,786,779 | Quick | Dec. 30, 1930 |
| 2,587,496 | Manteria | Feb. 26, 1952 |